UNITED STATES PATENT OFFICE.

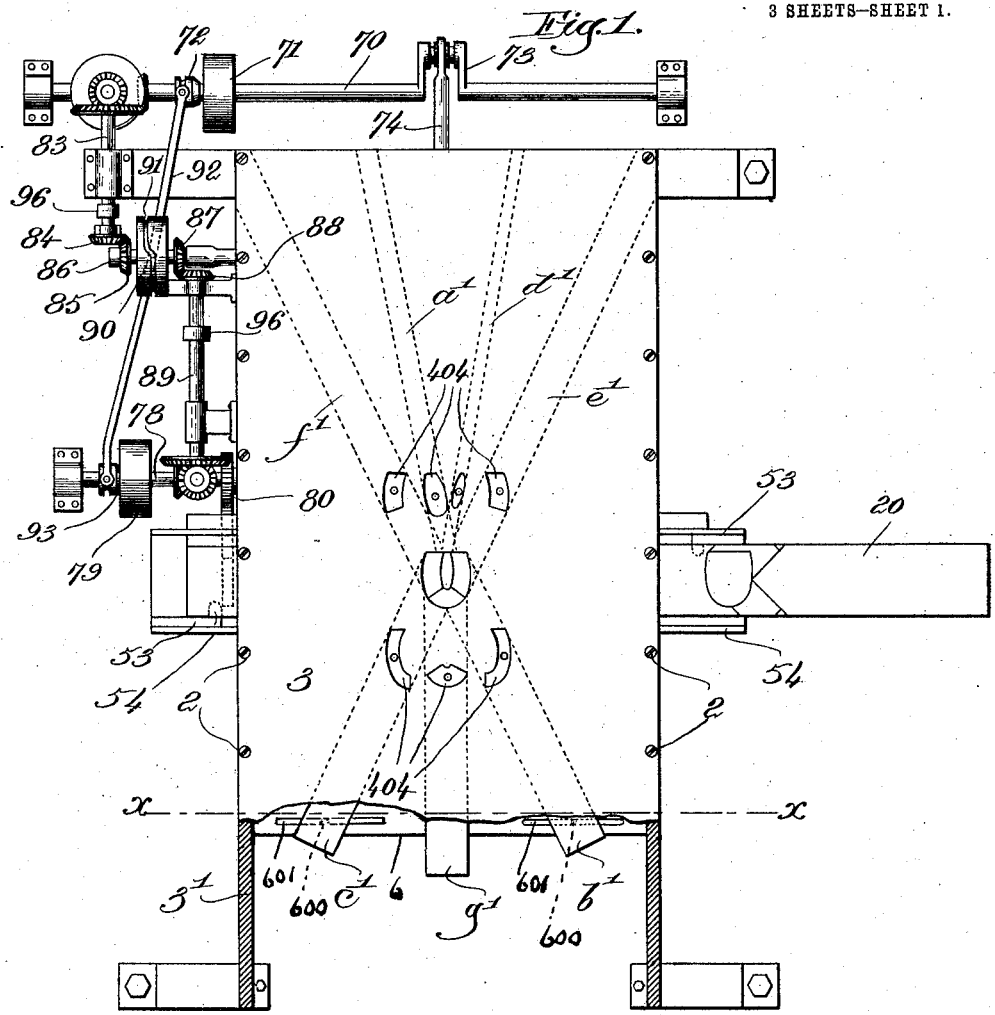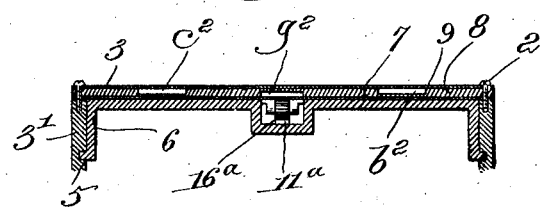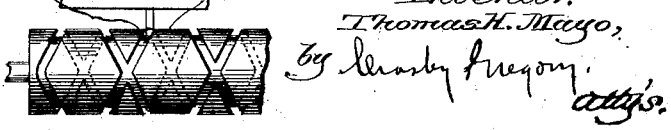

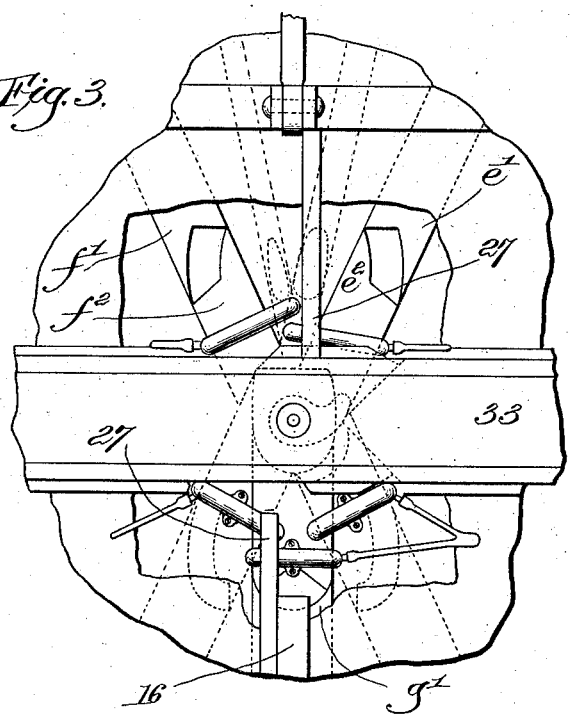

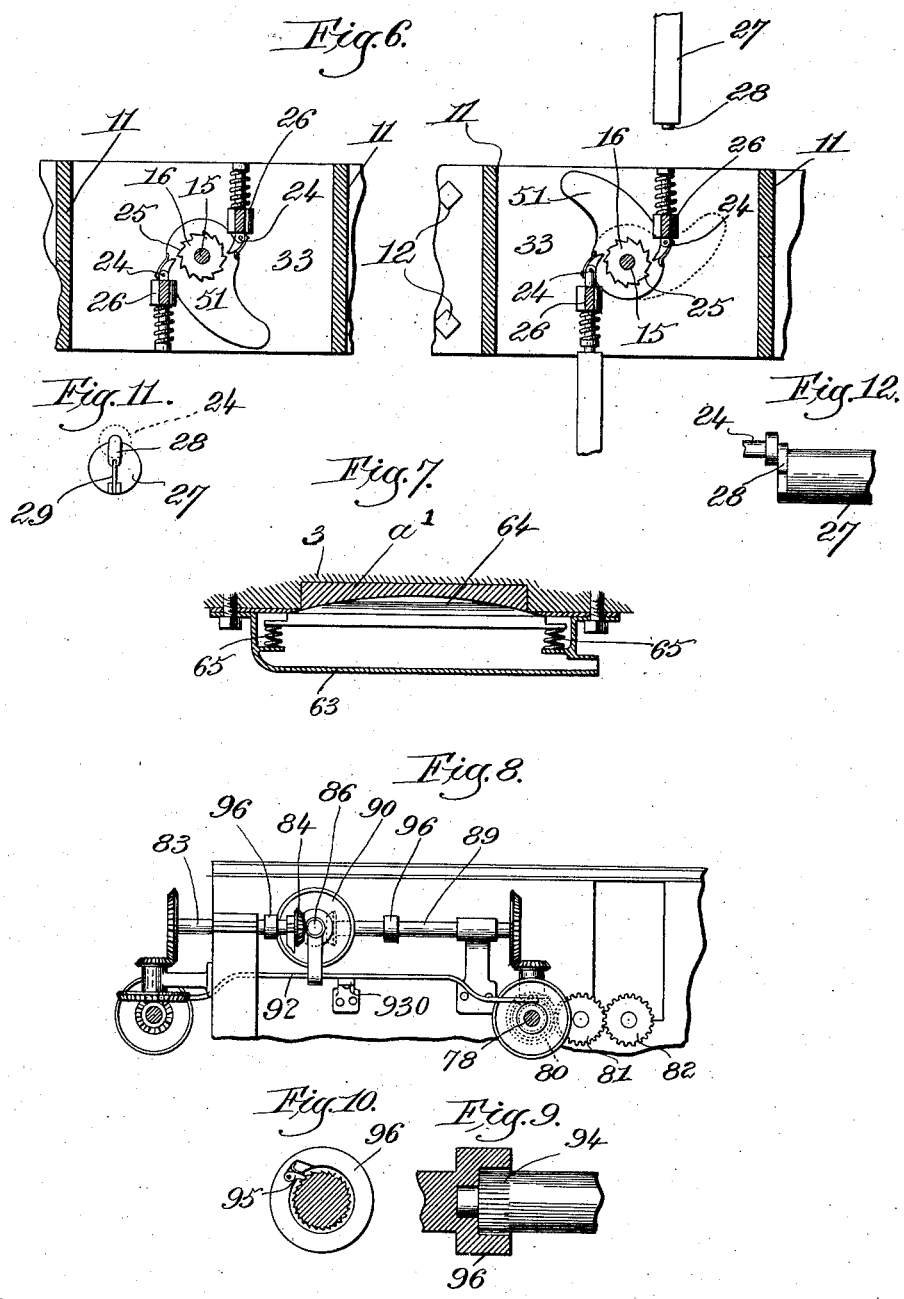

THOMAS H. MAYO, OF MELROSE HIGHLANDS, MASSACHUSETTS, ASSIGNOR TO UNITED SHOE MACHINERY COMPANY, OF PATERSON, NEW JERSEY, A CORPORATION OF NEW JERSEY.

MACHINE FOR MAKING HEELS.

1,025,534.

Specification of Letters Patent.

Patented May 7, 1912.

Application filed May 23, 1903. Serial No. 158,406.

*To all whom it may concern:*

Be it known that I, THOMAS HENRY MAYO, a citizen of the United States, and resident of Melrose Highlands, county of Middlesex, State of Massachusetts, have invented an Improvement in Machines for Making Heels, of which the following description, in connection with the accompanying drawings, is a specification, like letters on the drawings representing like parts.

In a patent granted to me July 28, 1903, No. 734,584, I have illustrated and claimed a machine for making heels having one or more pieced lifts, which machine comprises a matrix and selecting mechanism operating to select, and assemble in their appropriate relative positions in the matrix, the individual pieces composing the heel. The machine shown in said patent is so constructed that it will make only heels of a particular size and having an even number of lifts. My present invention aims to improve this machine, so that a single machine can be utilized to make heels of any size and shape and having any number of lifts desired. This is accomplished in my present invention by making both the matrix and selecting mechanism removable and interchangeable, so that matrices of different size and shape, and selecting mechanism having different sizes and arrangement of selectors may be employed according to the size, shape and height of heel it is desired to make. I have also simplified materially the driving mechanism for the machine, and have improved various other parts thereof, as will be more fully hereinafter set forth.

In the drawings, Figure 1 is a plan view of my improved machine, with a part of the bed broken out; Fig. 2 is a section on the line $x$—$x$, Fig. 1; Fig. 3 is a bottom plan view of a portion of the machine immediately beneath the matrix; Fig. 4 is a view of the detachable and interchangeable matrix; Fig. 5 is a section on the line $y$—$y$, Fig. 4; Fig. 6 is a detail of the improved matrix bed lowering mechanism, it being a section taken on substantially the line $b$—$b$, Fig. 5; Fig. 7 is a detail showing the improved form of paste-cup; Fig. 8 is a side elevation of the driving mechanism; Figs. 9 and 10 are details of the driving mechanism; Figs. 11 and 12 are details of the fingers for operating the matrix bottom lowering mechanism; Fig. 13 is a section through the bed showing the means for operating certain of the selectors; Fig. 14 is a view showing the screw for operating the matrix supporting slide.

The machine herein illustrated is similar in its principal features to that shown in the said patent, and it comprises the main frame 3' having the bed 3 provided with grooves or runways in which the selectors $a'$, $b'$, $c'$, $d'$, $e'$, $f'$, $g'$, move and operate to carry the various pieces composing the heel from the hoppers 404 into the matrix.

The selectors are operated by means of a reciprocating frame 6 which plays back and forth beneath the bed, and is guided by any suitable guideways 5, said frame being operated from the crank-shaft 70 by means of a crank 73 and pitman 74. The selectors and the means for operating them I will refer to as "heel assembling mechanism."

The connection between the slide 6 and the various selectors is the same as that shown in my above mentioned patent and such that during the movement of the slide in one direction, the selectors $a'$, $b'$, and $c'$ are each moved toward the matrix, and carry into the matrix the three pieces composing one lift of the heel, while when said slide moves in the opposite direction, the three above named selectors are withdrawn, and the other selectors $d'$, $e'$, $f'$ and $g'$ are moved forwardly to carry into the matrix the four pieces composing the next lift of the heel. The heel which is thus made is similar to that illustrated in Patent No. 691,910, dated January 28, 1902. The matrix is carried by the matrix-carrier 20 which extends transversely across the machine beneath the bed 3, and is of a length to support two matrices.

Suitable mechanism is provided whereby when the requisite number of lifts have been built up in one matrix to form a heel, the selector-operating mechanism is rendered inactive and the matrix-carrier moved transversely of the machine to bring the second or empty matrix into position beneath the assembling mechanism, and to carry the filled matrix beyond the side of the machine and into position to have the completed heel ejected therefrom.

The construction and operation of the parts thus far referred to are fully described in my Patent No. 734,584, to which reference may be had.

In order to permit the building up or manufacture of different sizes and shapes of heels, it obviously is necessary that different sizes and shapes of selectors and also different sizes and shapes of hoppers should be used, according to the size and shape of the heel desired.

In my present invention I provide for thus changing the size and shape of the selectors and hoppers by making the bed 3 removable from the frame, so that different beds having different sizes and arrangements of selectors and hoppers can be used.

Any suitable means may be employed for removably securing the bed in position, and for convenience I have herein illustrated ordinary screws 2 for this purpose which pass through the bed and into the side pieces 3' of the frame. By merely removing the screws, the bed may be removed and a different bed substituted therefor.

The form of bed which I prefer to use is best shown in Fig. 2, and comprises the lower plate 7, the intermediate plate 8 and the upper plate 9. The plates 7 and 9 may simply be sheet metal plates, while the plate 8 must be sufficiently thick to permit the grooves or runways $a^2$, $b^2$, $c^2$, etc., to be milled or otherwise formed therein. The sheet metal plates 7 and 9 serve to form the top or bottom of the grooves, as the case may be.

The various selectors are detachably secured to the selector-operating mechanism, so that when the bed is removed the selectors are removed therewith. This may be done without in any way disturbing the operating mechanism. To accomplish this the slide 6 is provided with slots 601 in which are received pins 600 carried by certain of the selectors so that as the bed is removed from the frame the pins will be withdrawn from the slots, thus permitting the bed with the selectors to be removed without disturbing the selector-operating mechanism. It will be remembered that the selectors $a'$, $b'$, $c'$, operate simultaneously to assemble the pieces of one lift and that the selectors $d'$, $e'$, $f'$, $g'$ operate simultaneously to assemble the pieces of another lift. The selectors $b'$, $c'$ move in the same direction and are connected to the slide 6 to move therewith. The selector $a'$, however, moves in a direction opposite to that of the slide. The connection between the slide 6 and the selectors $b'$, $c'$ is shown in Fig. 1 of the drawings, from which it will be observed that said selectors have the pins 600 above referred to which operate in the slots 601 of the slides. A similar pin-and-slot connection (not shown) is employed between the selectors $e'$, $d'$, $f'$ and the slide 6. For operating the selector $g'$, the mechanism shown in Figs. 2 and 13 is employed, and a similar mechanism is employed for operating the selector $a'$, as shown in said figures. The selector $g'$ is provided with gear teeth which mesh with the teeth of a pinion $11^a$ carried by suitable bearings below the bed 3 of the machine. Said pinion $11^a$ also meshes with a rack $16^a$ which is rigid with the slide. As the slide moves, therefore, the pinion $11^a$ is rotated thereby moving the selector $g'$ in the opposite direction to that in which the slide moves. As stated above a similar construction is employed for operating the selector $a'$. The pinions $11^a$ are carried by the bed and when the bed is removed with the selectors, said pinions become disengaged from the racks $16^a$ which are permanently secured to the slide. This pin-and-slot connection for the selectors $b'$, $c'$, $e'$, $d'$ and $f'$ and the rack and pinion connection for the selectors $g'$ and $a'$ make a construction which permits the bed with the selectors to be readily removed from the frame without disturbing the selector-operating mechanism. The matrix is also made removable, so that the matrix corresponding to the size and shape of heel desired may be employed.

Referring now to Figs. 4 and 5, 21 designates the upper rail of the slide or matrix supporting member, and 33 the lower rail thereof, these parts being constructed the same as the corresponding parts in the machine shown in my Patent No. 734,584.

In the present application, the matrix is formed in a removable section 10 of the upper slide, and has the vertically adjustable bottom 30, by means of which the depth of the matrix can be varied. As herein shown, the removable section 10 has depending therefrom lugs or feet 11 which rest upon the lower rail 33, and are detachably secured thereto in any suitable way, as by bolts 12. Preferably I will make the upper rail 21 with the shoulders or rests 13 on which the ends of the removable section 10 rest, said section being detachably secured to the shoulders in any suitable way, as by screws 14. The matrix bottom has attached to it a screw-threaded stem 15 which works through a suitable nut 16, and this nut is secured to the lower rail 33, so that it can rotate therein, but is held from longitudinal movement. This may be accomplished in any suitable way, but I have herein illustrated retaining plates 18 which are received in recesses in the lower rail 33 and are detachably secured thereto by screws, and the edges of which enter the groove 19 in said nut. This permits the nut to turn but holds it against longitudinal movement. Secured to the nut is the cam 51 by means of which the matrix bottom is raised, as described in the above mentioned Patent No. 734,584, July 28, 1903. By means of this construction, the matrix may be readily removed from the carrier and a different sized matrix substituted. It will be understood, of course, that each of the two matrices on the carrier are thus made removable. The particular construction herein illustrated by means of which the removability of the matrix is secured, however, is not essential, as other constructions accomplishing this object would come within my invention.

In the machine illustrated in my said Patent No. 734,584 the matrix bottom is lowered only once during each two movements of the slide, that is after every other lift has been deposited in the matrix.

In my present invention, I provide means whereby the matrix bottom is lowered the thickness of one lift as each lift is deposited in the matrix. To accomplish this, I provide two oppositely disposed spring-pressed pawls 24 to coöperate with ratchet teeth 25 on each nut 16. These pawls are supported in bearings 26, carried by the removable section 10 of the matrix-carrying member, and are normally slightly separated from the ratchet teeth. Said pawls are alternately advanced to engage the ratchet teeth by means of pawl-actuating fingers 27 carried by the slide 6. When the slide moves in one direction, one of the fingers actuates the corresponding pawl 24, and turns the nut to lower the matrix bottom, and when the slide moves in the opposite direction the other finger 27 actuates the other pawl, and gives the matrix bottom a second downward movement. The ratchet teeth are so arranged that each step of the ratchet lowers the matrix-bottom the distance equal to the thickness of a single lift.

In case it is desired to adapt the machine to build heels of the same size, but of thinner or thicker lifts, it would be necessary then to change the matrix bottom and nut 16 and substitute for them other matrix bottoms and nuts in which the screw thread between the nut and stem had a finer or coarser pitch. The way the nut is mounted makes it interchangeable, and permits it to be changed with the matrix bottoms. If it is desired to change merely the size of the matrix, in order to operate on a different sized heel, but one having the same number of lifts, and lifts of the same thickness, all that would be necessary would be to change the matrix and its bottom without changing the nut. The idea of making the nut and the matrix separately interchangeable becomes important therefore. It will be understood, of course, that whenever a change in the number of lifts or thickness of the lifts is made, the driving gear connecting the shaft 70 and screw-shaft 77 will have to be altered to make these shafts operate in proper relation to each other.

The operation of my machine as thus far described is as follows:—Assuming that the right hand matrix, Fig. 6, is in position beneath the assembling mechanism, and the other matrix outside of the frame, it will be understood that both matrices have their bottoms raised, and the cams 51 in full line position. At this point the shaft 70 is rotated to reciprocate the slide 6, and through the selectors assemble the lifts successively in the operative matrix. During each movement of the slide, the pieces of one lift are assembled in the matrix, and at the same time one of the fingers 27 engages the corresponding pawl 24, and turns the nut 16 to lower the matrix a distance equal to the thickness of the lift. Upon the reverse movement of the slide, a second lift is assembled and the other finger strikes the corresponding pawl and gives the nut a second forward movement, to again lower the matrix bottom.

When a heel having the requisite number of lifts has been built, suitable mechanism which will be more fully hereinafter described, is brought into operation to cause the shaft 70 to cease its rotation, and to start the rotation of the screw-shaft 77.

The matrix supporting member 20 carries a finger (Fig. 14) which engages the groove 780 in the shaft 77, so that as said shaft is turned the member 20 is given a traverse across the machine as more fully described in my Patent No. 734,584. The slide is now stationary, but the rotation of the shaft 77 carries the matrix-supporting member transversely of the machine, or toward the right Fig. 6, and carries the filled matrix outside of the machine, and brings the other or empty matrix into operative position beneath the selectors. This is the position shown in Fig. 1. As the filled matrix reaches its position outside of the machine, the cam 51 which has been turned from the full to the dotted line position, Fig. 6, during the lowering movement of the matrix-bottom, engages a suitable stop 53 which stop turns the cam and the nut back into the full line position Fig. 6, (it being remembered that normally the pawls 24 are separated from the ratchet-teeth sufficiently to permit this return movement of the ratchet) thereby raising the matrix bottom and ejecting the completed heel.

It will be noted that the pawls 24 are carried by the matrix-supporting member, and that said pawls may not engage the guides 54 at the sides of the machine through which the matrix-carrying member 20 plays, said pawls are situated entirely within the limits of the lower rail 33, as best seen in Fig. 6. When the crank-shaft 70 ceases its rotation, in order to permit the screw-shaft 77 to shift the position of the matrices, one of the fingers 27 is left in its forward position, that is in such position as to be in the path of movement of the head of the corresponding pawl 24 as the empty matrix is moving into position beneath the assembling devices. In order that neither the pawl nor the finger may be injured by striking one another I make each of the fingers 27 with the end 28 thereof yieldable laterally, so that when said pawl strikes the yieldable portion of the finger, said portion gives to accommodate the sliding or lateral movement of the matrix-carrying member.

Various ways of providing the finger with the yieldable portion may be employed. I have herein illustrated the fingers 27 as each having a block 28 connected to its end by a yieldable connection such as spring 29 which permits the block to swing in either direction when engaged laterally by the head of pawl 26 but which normally holds the block centered.

Assuming that the fingers 27 are brought to rest in the position shown in Fig. 6, when the shaft ceases its rotation, it will be seen that as the matrix supporting member moves to the right, the end of the lower pawl at the left of said figure will engage the block 28 on the forward finger, but since said block is yieldingly held in operative position, it will yield to the movement of the pawl. As soon, however, as the shaft 70 again begins its rotation, and said forward finger 27 is retracted, the spring 29 immediately throws the block 28 into its normal operative position. This means for lowering the matrix bottom permits me to stop the shaft 70 with either finger forward, and therefore permits me to build a heel having any number of lifts, whether the number be odd or even. This I consider as extremely important, because it provides a construction in which a heel of any height can be made.

In my said Patent No. 734,534, I have shown the shaft 77 as having a single screw-thread thereon, and in order to reciprocate the matrix carrying member, I was obliged to rotate said shaft first in one direction and then in another.

In my present improved structure, I employ the endless screw shown in Fig. 14 for operating the matrix-carrying member, this construction permitting me to rotate the screw-shaft 77 continuously in the same direction, and yet get a reciprocating movement of the matrix-carrying member 20.

I will now describe my improved driving mechanism. The shaft 70 has loose thereon a driving pulley 71 which is adapted to be clutched to said shaft by means of a suitable clutch 72. The screw-shaft 77 is driven from a driving pulley 79 which is illustrated as being loosely mounted on a counter-shaft 78, said latter shaft being geared to said shaft by means of gearing 80, 81, 82 the gears 80 and 82 being fast on the shafts 78 and 77 respectively, and being connected together by the idler 81. Connected to the shaft 70 by suitable gearing is a counter-shaft 83 having a bevel gear 84 thereon which meshes with a gear 85 on a cam-shaft 86. Said cam-shaft 86 has another gear 87 thereon which meshes with a gear 88 on a second countershaft 89. This last named counter-shaft is geared to the shaft 78 by suitable gearing. 90 designates a clutch-actuating cam which is fast on the cam-shaft 86, said cam having a groove 91 therein in which plays a projection or stop on a clutch actuating lever 92, pivoted intermediate its ends in any suitable way as at 930. This clutch-operating lever is connected to and operates the clutches 72 and 93 respectively, and said clutches are so arranged that the movement of the lever in one direction disengages one clutch and causes the other to be engaged, while the movement of the lever in the opposite direction disengages the latter clutch and causes the former to be engaged. The construction is such that the cam-shaft 86 is continuously operated from the shafts 70 and 78 alternately, and to accomplish this I have made each of the countershafts 83 and 89 in two parts and connected said parts by a pawl and ratchet mechanism. Referring to Figs. 9 and 10 which show such pawl and ratchet mechanism, it will be seen that one part of each of said shafts has the ratchet teeth 94 thereon, while the other part of the shaft has a pawl 95 coöperating with said teeth.

I have illustrated the pawl-carrying part of each shaft as having an enlarged portion 96 provided with a socket in which the ratchet is received. The arrangement of pawls and ratchet teeth is such that when the shaft 83 is being driven from the shaft 70, said shaft 83 will through its pawl and ratchet mechanism rotate the cam-shaft 86 forwardly. At such time, the shaft 78 is stationary, and the pawl on the shaft 89 therefore merely clicks over its ratchet. When the shaft 86 has made a half turn, the cam-groove 91 in the cam 90 shifts the clutch operating lever 92 and releases the clutch 72, and causes the clutch 93 to be engaged. The shaft 70 then ceases its rotation, but the shaft 78 is set in operation, and through the gearing rotates the countershaft 89, and also the screw-shaft 77. The rotation of the countershaft through its pawl and ratchet continues the forward rotation of the cam-shaft 86 and its cam, the pawl and ratchet in the shaft 83 permitting such rotation while the shaft 70 is stationary. It will thus be seen that the cam 90 is continuously operated, and that it controls the clutches 72 and 93, and therefore controls the times of operation of the shafts 70 and 77.

In the machine shown in my said Patent

No. 734,584, the individual pieces composing each lift of the heel were smeared with paste or adhesive material, while being moved into position by the selectors, the said paste being supplied to the runway from a paste-cup situated beneath the bed and communicating with the runway through a slot. The opening between the runway and paste-cup was continuously open, and as a result, paste would continually ooze through said openings whether or not the machine was in operation. In this construction too much paste was liable to be delivered to the runway if the machine was running slowly or was stopped. To prevent this, I have in this embodiment of my invention provided suitable valves controlling the admission of the paste from the paste-cup to the runway, which valves are normally closed, but are adapted to be opened by the passage of the pieces of the heel over them.

Referring to Fig. 7, 63 indicates a suitable paste-cup secured to the bottom of the bed 3 and beneath the runway in which the selector $a'$ is operating, all shown in my said Patent No. 734,584.

64 designates a suitable spring-pressed valve which normally closes the opening between the paste-cup and the runway, and which is constructed to extend through the opening and partially into the raceways, said valve being held in such position by the springs 65. As the selector takes a piece of leather from the hopper, and moves it forward over the paste-cup, such leather strikes the rounded top of the valve 64, and depresses the latter, thereby allowing sufficient paste to ooze through into the raceway to coat the piece of leather. After the piece of leather has passed off from the valve, the springs 65 raise the latter, whereby the opening is closed, and the supply of paste stopped.

In order that the valve may not be held depressed by the selector, I make the bottom of the selector concave, as best shown in Fig. 7, so that said selector may ride over the valve while it is in its elevated position. With this construction, the valve is only opened momentarily while the piece of leather is passing over it, and then is immediately closed.

The matrix which I employ is an expansible one, similar to that illustrated in my said Patent No. 734,584, and comprises the two sliding blocks 43 and 44, each of which forms a portion of the side wall of the matrix, and with the fixed block 45 comprises the entire matrix.

When the matrix is in operative position to receive the pieces from the selector mechanism, it is held in expanded position by means of suitable springs 46. These springs are received in grooves which are formed partially in the blocks 43 and 44, and partially in the fixed block 47. The said spring is confined in position by the end walls of the grooves, and tends normally to hold the matrix expanded. It will be understood of course, that it is necessary to employ change-gearing between each of the shafts 70 and 78, and the cam shaft 86, because the number of times which it is necessary to rotate the shaft 70 before the clutch-operating cam is thrown into operation depends upon the number of lifts which the heel is to contain.

While I have herein illustrated one way in which the matrix and the assembling mechanism may be made interchangeable, I do not wish to be limited to the exact construction shown, as it will be obvious that various other ways of accomplishing the same result may be employed without departing from the spirit and scope of the invention.

Having described my invention what I claim as new and desire to secure by Letters Patent is:—

1. In a machine for making heels, assembling mechanism for assembling in the proper relative positions the various pieces composing the heel, a reciprocating matrix-supporting member, and a matrix removably sustained by said matrix-supporting member and movable thereby into and out of operative position relative to the assembling mechanism and capable of removal from its supporting member when in inoperative position without disturbing the assembling mechanism.

2. In a machine for making heels, heel-assembling mechanism for assembling into proper relative positions the various pieces composing the heel, a reciprocatory matrix-supporting member, a plurality of matrices sustained thereby and movable thereby into and out of operative position relative to the assembling mechanism and each capable of being removed from its supporting member when in inoperative position without disturbing the assembling mechanism, and means to move the matrix-supporting member to bring said matrices alternately into operative position.

3. In a device for making heels, a frame, a matrix removably supported thereby, and forming one of a plurality of interchangeable matrices and appliances for selecting and assembling in proper relative positions the appropriately shaped pieces to form each lift of the heel, the removability of the matrix permitting any one of said interchangeable matrices to be employed in the same frame.

4. In a machine for making heels, a frame, appliances removably sustained by the frame for selecting and assembling in proper relative positions the appropriately-shaped pieces to form the heel, operating mechanism for said appliances, connections between said mechanism and appliances for operating one from the other detachable by the removal of the appliances, thereby permitting the appliances to be removed from the frame without disturbing the operating mechanism, and a matrix in which the heel is formed.

5. In a machine for making heels, a frame, assembling mechanism removably sustained thereby for assembling in the proper relative positions the appropriately-shaped pieces to form the heel, operating mechanism for said assembling mechanism, connections between said mechanisms for operating one from the other detachable by the removal of the appliances, thereby permitting the assembling mechanism to be removed from the frame without disturbing the operating mechanism, a matrix, and means to move the matrix relative to the assembling mechanism.

6. In an apparatus for making heels, a matrix, a removable bed provided with a plurality of runways leading to the matrix, selectors in the runways, selector-operating mechanism, and detachable connections between the selectors and the selector-operating mechanism, whereby the bed with the selectors may be removed without disturbing the selector-operating mechanism.

7. In an apparatus for making heels, a frame, a bed removably supported thereby and provided with a plurality of runways, selectors in the runways and removable with the bed, selector-operating mechanism carried by the frame, and detachable connections between the selectors and the selector-operating mechanism whereby the bed and the selectors may be removed from the frame without disturbing the selector-operating mechanism.

8. In an apparatus for making heels, a frame, a matrix removably supported thereby and forming one of a plurality of interchangeable matrices, a bed also removably supported by the frame and forming one of a plurality of interchangeable beds, said bed having a plurality of runways leading to the matrix, selectors in the runways, and means to operate the selectors, the removability of the matrix and bed permitting any one of said interchangeable matrices or beds to be employed.

9. In an apparatus for making heels, a frame, a matrix removably supported thereby, a bed also supported by the frame and removable therefrom independently of the matrix, said bed having a plurality of runways converging toward and leading to the matrix, selectors in the runways, and selector-operating mechanism detachably secured to the frame.

10. In an apparatus for making heels, a frame, a matrix-supporting member removable transversely thereof, a matrix detachably supported by said member, a bed supported by the frame and removable therefrom independently of the matrix, said bed having a plurality of runways converging toward and leading to the matrix, selectors in the runways, and selector-operating mechanism carried by the frame and detachably connected to the selectors.

11. In an apparatus for making pieced heels, a matrix, a removable bed having a plurality of runways leading to the matrix, a selector in each runway, and selector-operating mechanism supported independently of the bed, and detachable connections between said selector-operating mechanism and the selectors whereby the bed with the selectors can be removed without disturbing the selector-operating mechanism.

12. In an apparatus for making pieced heels, a matrix, a bed having a plurality of runways converging toward and leading to the matrix, a selector in each runway, and selector-operating mechanism detachably connected with the selectors, said bed being removable whereby it with the selectors may be disconnected bodily from the selector-operating mechanism without disturbing the latter.

13. In apparatus for making pieced heels, a frame, a matrix, a bed removably sustained by the frame and having a plurality of runways leading to the matrix, a selector in each runway, a selector operating member, and connections between the selectors and their operating member comprising headless pins on the selectors entering slots in the operating member, whereby the selectors may be withdrawn from the operating member when the bed is removed.

14. In apparatus for making pieced heels, a frame, a matrix bodily removable therefrom, a bed bodily removable from the frame having a plurality of runways converging toward and leading to the matrix, selectors in the runways each provided with a headless pin, and selector-operating mechanism having slots with which said pins engage, whereby said bed and selectors are bodily removable together from the frame.

15. In an apparatus for making pieced heels, a frame, a matrix bodily removable therefrom, a bed bodily removable from the frame having a plurality of runways converging toward and leading to the matrix, a selector in each runway, and selector-operating mechanism permanently carried by the frame and having operating connections with the selectors detachable by the removal of the bed, the bed and selectors being thus made bodily removable together from the frame and selector-operating mechanism.

16. In an apparatus for making heels, seclutch lever to operate said clutches alternately, and a continuously operating cam to control said lever.

29. In an apparatus for making heels, a matrix carrier, a matrix supported thereby, heel assembling mechanism to deliver to the matrix the various pieces composing the heel, and means to move the carrier relative to the heel assembling mechanism, said means comprising a shaft having a double reverse spiral groove, whereby the said carrier derives its motion in both directions from the rotation of the shaft in one direction.

30. In an apparatus for making heels, assembling mechanism for assembling in the proper relative positions the various pieces composing the heel, means to operate said assembling mechanism, a removable matrix to receive the pieces composing the heel from the assembling mechanism located beneath said mechanism, and means to support the matrix movable out of position beneath the assembling mechanism to permit the matrix to be removed without disturbing the operation of the operating means.

31. In a machine for making heels, a frame, a matrix supported thereby, selecting mechanism removably sustained by the frame and adapted to select and assemble in the proper relative positions the appropriately-shaped pieces to form a heel, operating means for the selecting mechanism, and connections between said means and selecting mechanism for operating one from the other detachable by the removal of said mechanism, thereby permitting the latter to be removed from the frame without disturbing the operating means.

32. A machine for making heels, having, in combination, a plurality of hoppers arranged in groups to hold the separate parts to make heels, a plurality of assembling devices arranged in groups to engage said parts, one device for each part, a building table, means for operating the groups of devices, one group at a time, to transfer the parts from the hoppers and assemble them on the building table, and means for regulating the operation of the machine to build heels having an odd or even number of lifts at the will of the operator.

33. A machine for making heels, having, in combination, a plurality of hoppers holding the separate parts to make a heel, a plurality of assembling devices for engaging said parts, one device for each part, a building station, means for operating said devices to remove said parts from the hoppers, and means for relatively actuating said devices and the building station to assemble the removed parts on the station in a position superposed one on the other thereby forming a plurality of lifts for the heel and remove the station from the range of operation of said devices after an odd number of lifts have been so assembled.

34. A machine for making heels, having, in combination, a plurality of hoppers for holding the separate parts to make a heel, a plurality of assembling devices for engaging said parts, one device for each part, means for operating said devices to transfer said parts from the hoppers and assemble them in a position superposed one on the other thereby forming a plurality of lifts for the heel, and means for stopping the operation of said devices on the heel being made after an odd number of lifts have been so assembled.

35. A machine for making heels, having, in combination, a plurality of hoppers for holding the separate parts to make a heel, a plurality of assembling devices for engaging said parts, one device for each part, means for operating said devices to transfer said parts from the hoppers and assemble them in a position superposed one on the other thereby forming a plurality of lifts for the heel, and means for removing the superposed lifts from the range of operation of said devices after an odd number of lifts have been so assembled.

In testimony whereof, I have signed my name to this specification, in the presence of two subscribing witnesses.

THOMAS H. MAYO.

Witnesses:
Louis C. Smith,
Geo. W. Gregory.